(12) United States Patent
Plettinck et al.

(10) Patent No.: US 8,830,513 B2
(45) Date of Patent: Sep. 9, 2014

(54) METHOD AND APPARATUS FOR OPTIMIZING A DESTINATION VARIABLE DOCUMENT FROM A SOURCE VARIABLE DOCUMENT HAVING RECURRING AND VARIABLE CONTENT

(71) Applicant: Esko Software BVBA, Ghent (BE)

(72) Inventors: Lieven Plettinck, Wingene (BE); Luc Henri Maria Leon Schildermans, Marakerke (Ghent) (BE); Kris Slegers, Nieuwkeeerken-Waas (BE)

(73) Assignee: ESKO Software BVBA, Ghent (BE)

( * ) Notice: Subject to any disclaimer, the term of this patent is extended or adjusted under 35 U.S.C. 154(b) by 0 days.

(21) Appl. No.: 13/650,924

(22) Filed: Oct. 12, 2012

(65) Prior Publication Data

US 2014/0104628 A1    Apr. 17, 2014

(51) Int. Cl.
*G06K 15/02* (2006.01)
*G06T 11/00* (2006.01)
*G06F 3/12* (2006.01)
*G06F 17/00* (2006.01)

(52) U.S. Cl.
USPC .......... 358/1.15; 358/1.18; 715/221; 715/276

(58) Field of Classification Search
None
See application file for complete search history.

(56) References Cited

U.S. PATENT DOCUMENTS

| 4,994,614 | A * | 2/1991 | Bauer et al. .................... 564/300 |
| 7,069,501 | B2 * | 6/2006 | Kunitake et al. .............. 715/234 |
| 7,113,952 | B2 * | 9/2006 | Aoyama et al. ............... 715/234 |
| 7,456,990 | B2 * | 11/2008 | Gauthier ....................... 358/1.15 |
| 7,880,750 | B2 * | 2/2011 | Romney ........................ 345/629 |
| 2011/0134485 | A1 * | 6/2011 | Ito ................................. 358/1.18 |
| 2011/0141508 | A1 * | 6/2011 | Inoue et al. .................. 358/1.13 |

OTHER PUBLICATIONS

ISO 32000-1, Document management—Portable document format—Part 1: PDF 1.7, Jul. 1, 2008, Section 8.10 "Form XObjects".
ISO 16612-2, Graphic Technology—Variable data exchange—Part 2: Using PDF/X-4 and PDF/X-5 (PDF/VT-1 and PDF/VT-2), Aug. 15, 2010, Section 6.7 "Recurring graphical object definitions".
Achieving Reliable Print Output from Adobe Applications when Using Transparency, Chapter 2: Flattening basics, pp. 4-6; © 2004 Adobe Systems Incorporated.
ESKO Artwork Automation Engine Reference Guide, Aug. 25, 2010, Contents, pp. 1-13; Section 5.7, "Convert CMYK Colors," pp. 64-65 and Section 5.38, "Export PDF," pp. 114-122.

* cited by examiner

*Primary Examiner* — Scott A Rogers
(74) *Attorney, Agent, or Firm* — RatnerPrestia (57) ABSTRACT

Methods, and computer systems and computer program products for performing them, for storing a destination document from a source document. Recurring content in the source document is flattened and stored in a first memory location, and then for each page in the source document, the page is flattened using the variable and (stored) recurring content, and portions influenced by the variable content are extracted and stored in a second memory location. The content in the first and second memory locations may be optionally color converted from a source color space to a device color space and stored in third and fourth memory locations, respectively. For each page n, a new page is added to the destination document comprising the flattened, recurring content stored in the first (or third, if color-converted) memory location and the flattened, variable content stored in the second (or fourth, if color-converted) memory location.

19 Claims, 5 Drawing Sheets
(4 of 5 Drawing Sheet(s) Filed in Color)

METHOD AND APPARATUS FOR OPTIMIZING A DESTINATION VARIABLE DOCUMENT FROM A SOURCE VARIABLE DOCUMENT HAVING RECURRING AND VARIABLE CONTENT

BACKGROUND OF THE INVENTION

The process of flattening and color converting a document, such as a document that is in Portable Document Format (PDF) (hereinafter "PDF document" or PDF") is well known in the industry, as described, for example, in "Achieving Reliable Print Output from Adobe Applications when Using Transparency," a White Paper published by Adobe Systems Incorporated in 2004, accessible at http://partners.adobe.com/public/asn/en/print_resource_center/TXPGuide.pdf.

Figure 1:
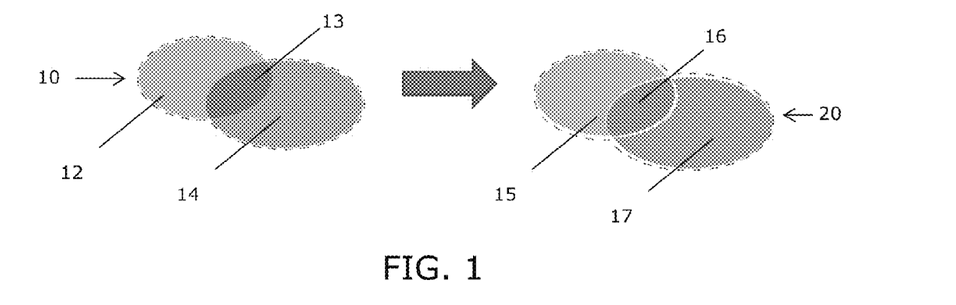
FIG. 1 is an exemplary illustration of the concept of flattening generally in reference to the prior art, and of a flattened recurring section in reference to an embodiment of the present invention.

FIG. 1 illustrates an exemplary such flattening process. A document, such as a PDF, containing a collection of graphical objects 10 (e.g. ellipses 12 and 14 each filled with a color to the left of the arrow shown in FIG. 1) stores these objects in a stacking order ("z-order") in which the objects can overlap one another. The resulting color of areas, such as area 13, where objects overlap each other is determined by a rendering algorithm, such as that described in the PDF reference (ISO 32000-1). The rendering algorithm takes into account the color of the contributing objects, several transparency mechanisms, overprint attributes and the z-order of objects.

Flattening consists of simplifying the object stack 10 by replacing the original objects 12 and 14 on the left side of the arrow with new non-overlapping objects ("islands") shown on the right side of the arrow, namely islands 15, 16 and 17 that are calculated from the intersection of original objects. The color of these "islands" is calculated from the interaction of the original objects contributing to the overlap of these "islands". For example, given the cyan ellipse 12 and an overlapping magenta ellipse 14 with overprint to the left of the arrow in FIG. 1, the flattened result to the right of the arrow contains three objects: island 15 in cyan, corresponding to the area of ellipse 12 that does not intersect with ellipse 14; island 17 in magenta, corresponding to the area of ellipse 14 that does not intersect with ellipse 12; and island 16, corresponding to the intersecting areas of ellipse 12 and ellipse 14, in blue. Flattening of a PDF may be used in the industry to raster image process ("RIP") PDFs on raster image processors ("RIPs") incapable of handling the full PDF transparency model. A second reason to use flattened PDFs is that it is possible to create PDFs where color management has already been applied to target a PDF at a particular device. Applying color management on the original objects may lead to unwanted results, since transparency and overprint calculations generally need to be performed before color conversion to achieve color correct results. For example, with respect to printing ellipses from the example provided in FIG. 1 on a device with colorants a, b and c, convert the cyan from ellipse 12 to (a1,b1,c1) and the magenta from ellipse 14 to (a2, b2, c2) the correct result of color converting the blue (cyan+ magenta in overprint) of the intersection will be (a3,b3,c3) and not the overprint of (a1,b1,c1) and (a2, b2, c2).

A print job, especially a variable document used in the packaging and labels market, typically has a lot of recurring content. Such a variable document print job may contain, for example, a large amount of identical brand- and product-related content (brand images, brand name, ingredient copy, etc.). Variable content (serialization numbers, unique barcodes, track and trace elements, customer name, etc.) are added to the brand and product content. As used herein, the term "variable document" refers to a collection of "variable document instances," in which each "variable document instance" comprises a unique variation of a document, such as the part of a variable document for a target addressee. Each variable document instance may contain multiple pages. Each page in a variable document instance contains recurring content (the same for all variable document instances) and variable content (specific for this instance). The entire variable document may be stored, for example, in a single PDF file or may be spread over multiple files.

Thus, for example, a marketing campaign may comprise a three-page flyer to be distributed to 10,000 addressees. Page x of the flyer may contain graphics identical for all 10,000 addressees plus some additional information specific to each addressee. The variable document in this example therefore comprises 10,000 variable document instances of 3 pages each. The variable document may be stored in a single PDF/VT of 30,000 pages, or may instead be stored in 10,000 PDFs of 3 pages each, or in any combination of number of files and pages per file. The file storage protocol is immaterial to what is considered the "variable document," which comprises the full collection of files necessary to create the 30,000 pages required by this exemplary print job. Similarly, for a label production example, a run of 100,000 labels may contain some recurring content plus a unique barcode for each label. In this case the variable document comprises 100,000 variable document instances of a single page each. The variable document is typically stored in a single PDF/VT of 100,000 pages, but may also be stored in 100,000 PDFs of 1 page each.

PDF (ISO 32000-1) discloses an efficient way for storing recurring content. The recurring content is stored only once in a PDF in a form XObject. The content stream of each page in the PDF, representing a page in a variable document instance, refers to (but does not contain) these form XObjects and adds the non-recurring variable content that is valid for the particular page. This leads to more compact storage. RIPs also have optimization strategies to avoid RIPping the recurring content contained in form XObjects multiple times. There is no limitation, however, in the interaction of the recurring content in the XObjects with the variable content. Objects can overprint and can interact through the various transparency blending algorithms defined in the PDF reference.

PDF/VT (ISO 16612-2) takes the above concepts a step further. Using metadata attached to the form XObjects, an application can add hints to form XObjects to indicate that a form XObject really contains recurring data and should be optimized. This avoids RIP strategies mistakenly trying to optimize form XObjects that were introduced in the PDF for reasons other than storing recurring content.

It is possible to flatten and color-convert a PDF with recurring content stored in form XObjects by flattening the entire page content for every page. To do this, the flattening algorithm calculates the flattened result from the variable content plus the recurring content (recall that these objects can interact with transparency and overprint) and stores the flattened result in the page of the new PDF. The resulting PDF is large and not optimized for the RIP, because the recurring content is included in the flattened representation of every page.

There is a need in the art, therefor, for methods and systems for optimizing a consolidated document with recurring and variable content in a page description language ("PDL") document (such as, but not limited to, a PDF or PDF/VT document).

SUMMARY OF THE INVENTION

One embodiment of the invention comprises a method for storing a destination document corresponding to a source document, the source document and destination document each comprising one or more variable document instances comprising one or more pages of recurring content and variable content and comprising a plurality of objects arranged in a z-order stack. The method comprises for each page common to the one or more variable document instances in the source document, flattening recurring content and storing the flattened recurring content in a first memory location. For each page in the source document, the page is flattened using the variable content of that page and the stored flattened recurring content, and any portions of the flattened page in which the variable content contributes to the resulting data are extracted from the resulting data and stored in a second memory location. A new page is then added to the destination document comprising the flattened recurring content stored in the first memory location and the extracted portions stored in the second memory location.

Where the destination document is configured for output on an output device and the device color space is different than the source document color space, the method further comprises performing a color conversion from the source document color space to the output device color space before storing each page of the destination document. The source and destination documents may comprise portable document format (PDF) files, and the recurring content may be stored in the destination document as a form XObject. In particular, the recurring content may be stored as a form XObject at a bottom of the z-order stack with variable content on top of the form XObject. Where the method further comprises processing the destination file with a raster image processor (RIP) for output on the output device, storage of each instance of recurring content as a form XObject at a bottom of the z-order stack with the variable content on top of the form XObject may further comprise raster caching the recurring content with the RIP.

Still another aspect of the invention comprises a computer system for storing a destination document corresponding to a source document, the source document and destination document each comprising one or more variable document instances each comprising one or more pages with recurring content and variable content and comprising a plurality of objects arranged in a z-order stack. The computer system comprises data storage, such as a computer memory, having a plurality of memory locations and a processor configured to flatten content of the source document and to store the flattened content in one of the memory locations. The computer system also comprises stored instructions for causing the processor to carry out the any of the method steps as described above. Where the computer system comprises an output device having a device color space different than the color space of the source document, the instructions stored on the computer system further comprise instructions for causing the processor to perform the method steps for color converting the recurring content and extracted content, as described herein, and compiling pages of the destination document in accordance therewith. The computer system may further comprise a raster image processor (RIP) for preparing the destination document for output on the output device.

Still another embodiment of the invention comprises a non-transitory computer-readable medium that stores a computer program product for storing a destination document corresponding to a source document as described herein, the computer program product comprising instructions for execution by a processor for prompting the processor to perform the steps as described herein.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

The optimization methods and systems described herein generate a new graphics document (such as, but not limited to, a new PDF or PDF/VT) that is significantly more compact and can be output significantly faster on an output device (such as, but not limited to, a digital press). The destination documents as described herein reduce the time needed to RIP the document and, optionally. to color convert the destination document from the source document color space to the output device color space. The methods and systems described herein can potentially serve as an important technical cornerstone for building prepress solutions handling variable data jobs, by permitting an efficient way for color servers to handle variable data jobs in PDF/VT format.

Figure 2:
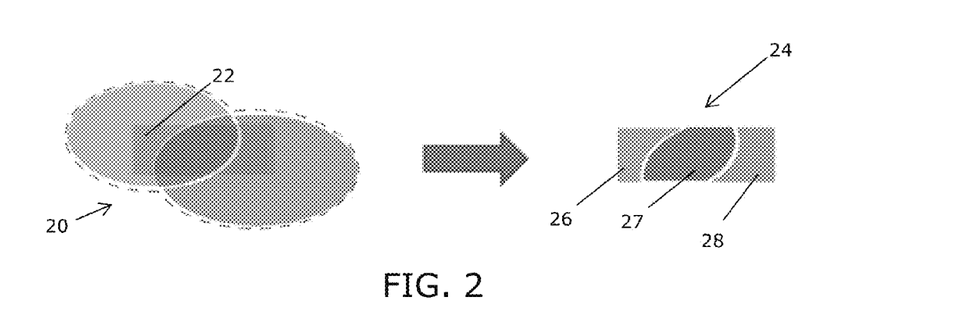
FIG. 2 is an exemplary illustration of exemplary flattened variable content stored in connection with an embodiment of the present invention.
Figure 3:
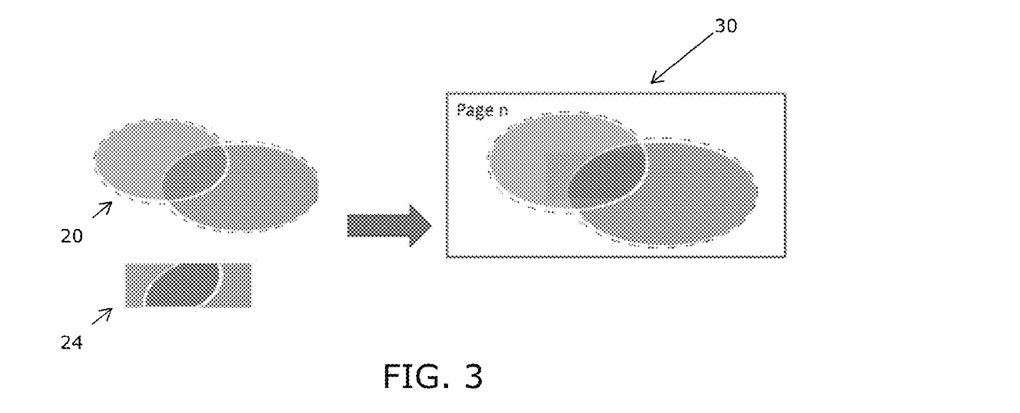
FIG. 3 is an exemplary illustration of how pages are generated from stored recurring content and stored flattened content in one embodiment of the present invention.
Figure 8:
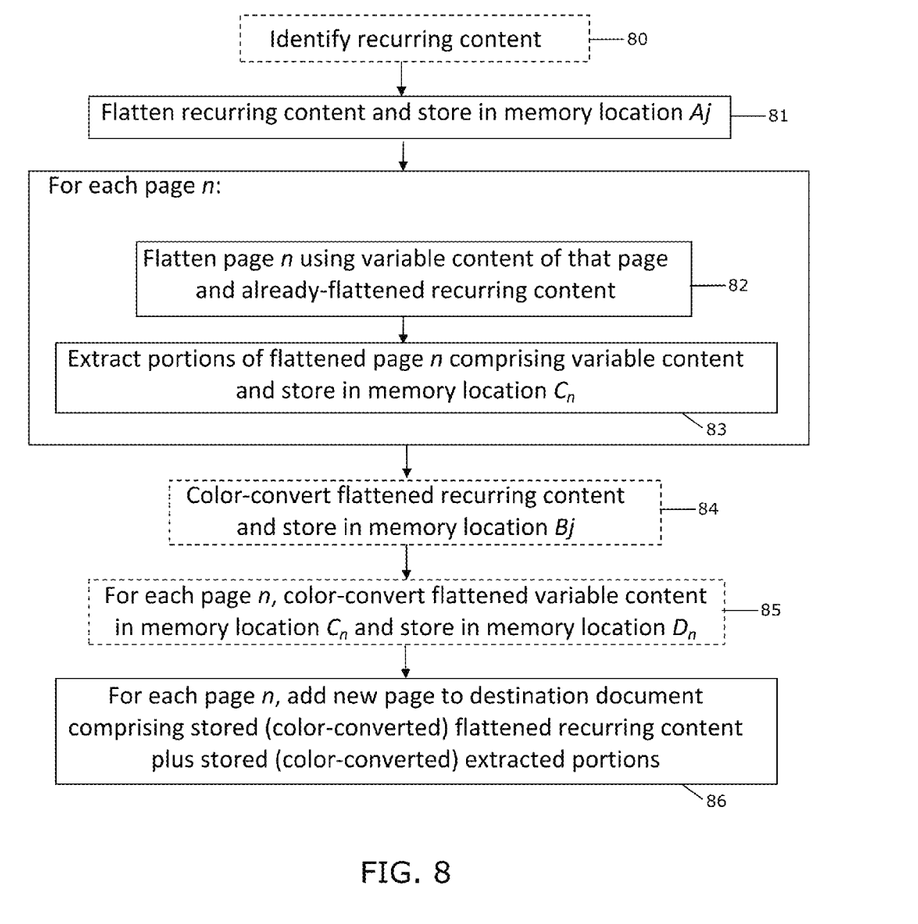
FIG. 8 is a flowchart of exemplary steps of one embodiment of the present invention, with optional steps depicted using dashed lines.

FIG. 8 comprises a flowchart that illustrates an exemplary embodiment of the method. Blocks indicated in dashed lines are optional. Thus, when no color conversion from the source document color space to the device color space is needed, an exemplary method may be carried out as described below. In step 81, for each page j common to each variable document instance, the recurring content of the source document is flattened (such as the flattened content 20 shown in FIG. 1) and stored in a memory location Aj. For every page n in the source document, in step 82, the page is flattened using the variable elements of that page and the already-flattened recurring content that is stored in memory location Aj. Thus, for example, as shown in FIG. 2, the variable elements of that page created by the overprinting of variable content, such as yellow rectangle 22, over the recurring content 20, generates green section 26, brown section 27, and orange section 28, collectively forming content 24. In step 83, the parts of the flattened page where variable elements have contributed to the results, namely content 24 comprising sections 26, 27, and 28, are extracted from the results of step 82, and the extracted elements are stored in a memory location $C_n$, as illustrated in FIG. 2. In step 86, for every page in the source document, a new page is added to the destination document comprising the flattened recurring content from memory location Aj plus the flattened variable content from memory location $C_n$, as illustrated in FIG. 3.

It should be understood that the source variable document typically comprises a plurality of variable document instances, and that each variable document instance may comprise one or more pages. Where each variable document instance comprises a plurality of pages, one of those pages may comprise variable content, or a plurality of the pages may comprise variable content. Thus, in step 81, the recurring content that is flattened and stored may itself comprise multiple pages of recurring content. For example, a three-page flyer may have three pages comprising recurring content, in which the recurring content of each page is stored in the first memory location as stored content A1, A2, and A3. Reference to first, second, third, fourth, etc. "memory locations" herein is for reference purposes only, and should not be interpreted as a limitation to any particular memory structure, size, or location. When color conversion from document color space to device color space is needed, after step 81, the flattened recurring content from memory location Aj is color-converted from the source variable document color space to the device color space and the results are stored in a memory location Bj, in accordance with step 84. For every page n in the source document, after step 83, the flattened variable content in memory location $C_n$ is color-converted from the document color space to the device color space, and the results are stored in a memory location $D_n$, as set forth in step 85. In step 86, for every page in the source variable document, a new page is added to the destination variable document comprising the flattened recurring content from memory location Bj plus the flattened variable content from memory location $D_n$. Alternative sequences of the steps in the method can be carried out. In particular, step 84 may be performed at any time after the generation in step 81 of the flattened recurring content to be color-converted. Step 85 may be performed after the flattened variable content of all pages n of the source document have been stored, or as each page n is stored. Similarly, step 86 may be performed after step 85 has been performed in connection with all pages n, or after performance of step 85 for each page n.

Thus, for example, in one non-limiting, exemplary sequence, the method first comprises, for each page common to the one or more variable document instances, the steps of flattening recurring content of the source variable document and storing the flattened recurring content in memory location Aj. For each page n in the source document, the method then comprises flattening the page using the variable content of that page and the flattened recurring content stored in memory location Aj, and extracting from the resulting data any portions of the flattened page in which the variable content contributes to the resulting data, and storing the extracted portions in memory location C. The recurring content from memory location Aj is color converted from the source color space to the device color space and stored in memory location Bj. For each page n in the source document, the variable content stored in memory location $C_r$, is color converted from the source color space to the device color space and stored in memory location $D_n$. For each page n, a new page is added to the destination document comprising the flattened, color-converted, recurring content stored in memory location 8, and the flattened, color-converted, variable content stored in memory location $D_n$.

In another non-limiting exemplary sequence, the method first comprises for each page j common to the one or more variable document instances, the steps of flattening recurring content of the source variable document and storing the flattened recurring content in memory location Aj. The recurring content from memory location Aj is then color converted from the source color space to the device color space and stored in memory location Bj. For each page n in the source document, the method then comprises flattening the page using the variable content of that page and the flattened recurring content stored in memory location Aj, and extracting from the resulting data any portions of the flattened page in which the variable content contributes to the resulting data, and storing the extracted portions in memory location $C_n$. The variable content stored in memory location $C_n$ is color converted from the source color space to the device color space and stored in memory location $D_n$. For each page n, a new page is added to the destination document comprising the flattened, color-converted, recurring content stored in memory location Bj and the flattened, color-converted, variable content stored in memory location $D_n$.

As noted in option step 80, variations of the claimed invention may include an additional step, prior to step 81, of analyzing the graphic content of the document in order to detect recurring content to be able to carry out step 81. Some file formats, such as PDF/VT, provide this information, but other formats do not.

When applied to PDF or PDF/VT documents, the disclosed methods allow generating a flattened and optionally color-converted PDF or PDF/VT document, with recurring content stored in form XObjects. The disclosed methods thereby enable efficient document storage by minimizing the overall document size. The disclosed methods have an additional benefit. Typical current-generation RIPs have limitations in their ability to optimize recurring content. In a typical implementation, the RIPping of form XObjects can be optimized using raster caching. In this way, the RIP RIPs the form only once and uses the RIPped pixels on subsequent occurrences of the form on a page in the document. Using raster caching as a strategy to optimize RIPping only works in a typical implementation if the form XObject is at the bottom of the z-order stack (with no objects below it) or if the form is opaque (no interaction with objects below it). The disclosed methods convert a PDF or PDF/VT with arbitrary stacking of recurring content in form XObjects and variable content to a PDF or PDF/VT with all recurring content in a form XObject at the bottom of the z-order stack and variable objects on top of it.

Figure 4:
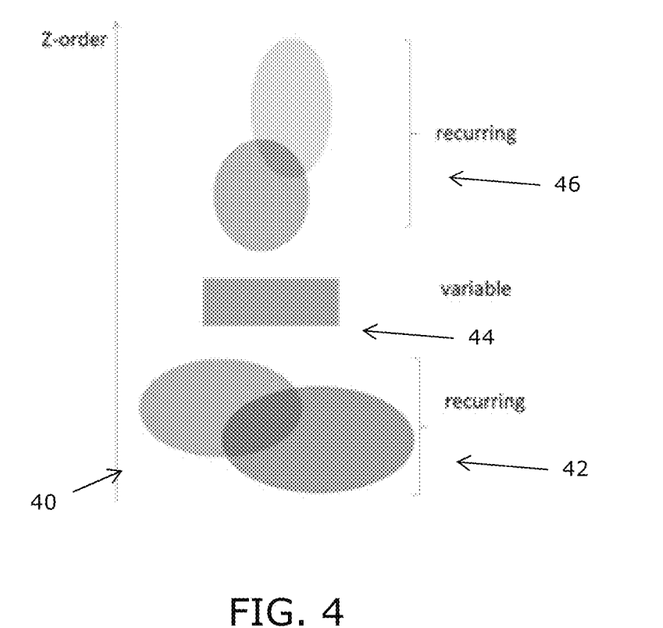
FIG. 4 is an exemplary illustration of a z-order stack prior to processing in accordance in an embodiment of the present invention.

For example, as illustrated in FIG. 4, at the bottom of an exemplary z-order stack 40 is a form XObject 42 with recurring content. Above that is variable content 44 in overprint. Above variable content 44 there is again a form XObject 46 with recurring content in overprint. Current RIPs are able to raster cache the bottom form XObject 42 but not the top one 46.

Figure 5:
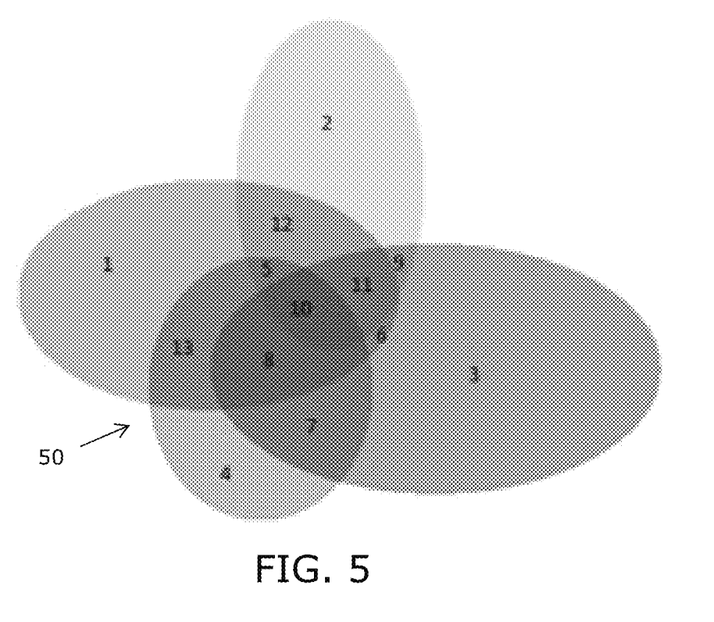
FIG. 5 is an exemplary illustration of flattened recurring content corresponding to the z-order stack of FIG. 4.

Step 1 of the disclosed method will flatten all recurring content, using both form XObjects 42 and 46, but leaving out the variable object. This will lead to a flattened representation 50 of recurring content with thirteen "islands" (numbered 1 through 13) shown in FIG. 5. For each of these islands, the flattened representation needs to store a coloring stack, namely what coloring was used at which z-order. For a PDF, coloring is typically interpreted as the paint operator and graphics state, as described in ISO 32000-1. For example, for island 13, the system needs to store that this island uses a cyan 100% color at z-order 1 (lowest) and a 30% black at z-order 4 with overprint.

Figure 6:
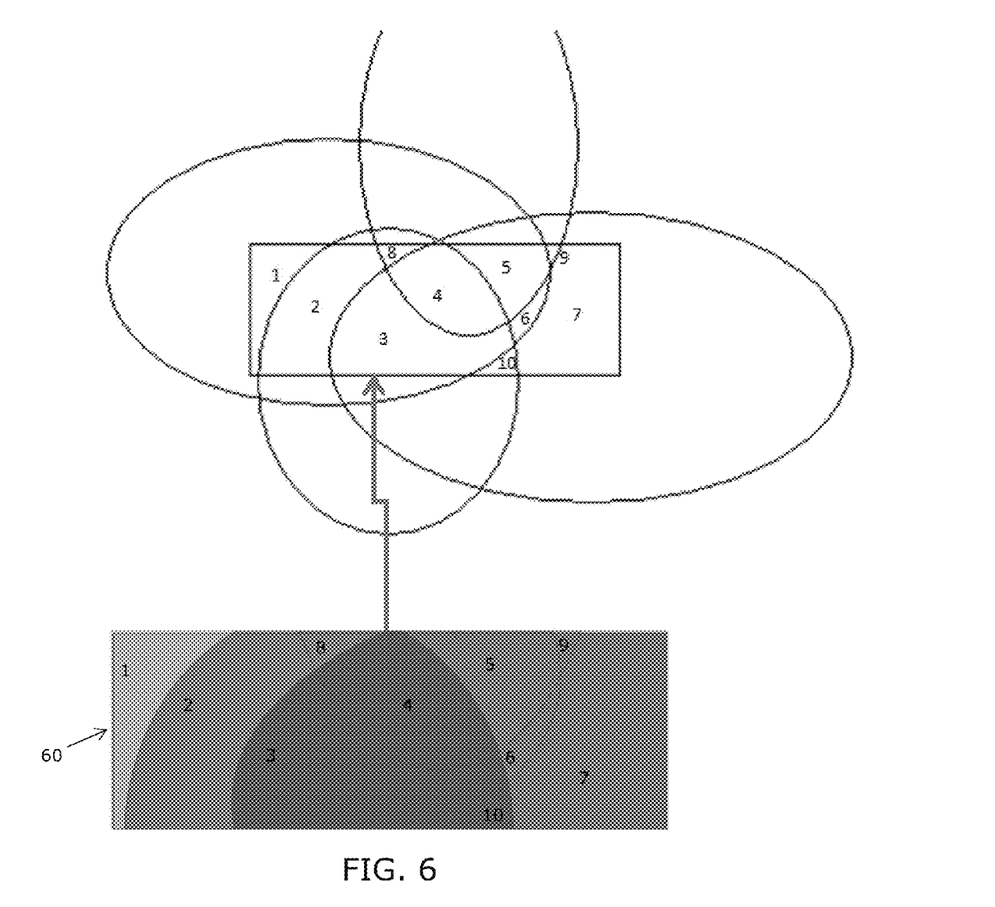
FIG. 6 is an exemplary illustration of flattened variable content corresponding to the z-order stack of FIG. 4.
Figure 7:
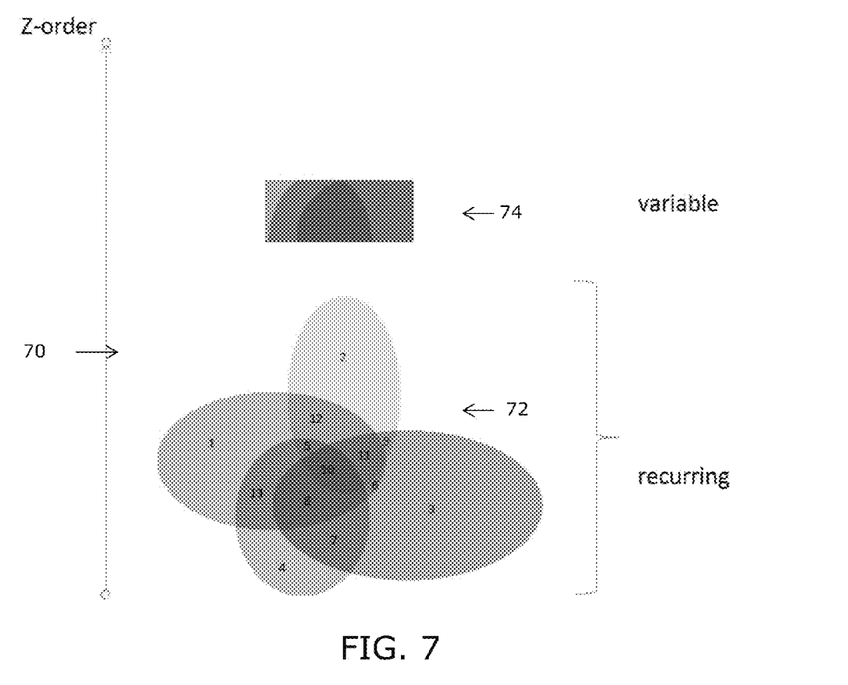
FIG. 7 is an exemplary illustration of an optimized z-order stack after processing in accordance with an embodiment of the present invention.

Flattening variable element 44 (the green rectangle) using the flattened representation of the recurring content will now subdivide the rectangle into ten islands (numbered 1 through 10) by intersecting the rectangle with the islands in the flattened representation of the recurring content 60, as shown in FIG. 6. The resulting coloring of those ten islands of the variable rectangle can be computed by inserting the coloring of the rectangle at the correct z-order in the coloring stack of the corresponding island of the flattened version of the recurring content. Note that in the particular example shown, the computation results in some of the coloring being the same in adjacent islands. In the output PDF, illustrated in FIG. 7, the flattened representation of the recurring content (or the color converted version of this representation) can be stored in a form XObject 72 at the bottom the z-order stack 70. The flattened version of the variable elements (or the color converted version) 74 can be stored on top of these. Thus, the disclosed method converts a PDF with complex stacking of recurring and variable content that prevents RIPs from efficiently optimizing, such as stack 40 shown in FIG. 4, into a simplified structure that enable the use of simple raster caching of recurring content, such as stack 70 of FIG. 7.

It should be understood that the method described above may be performed by a computer or computer system comprising data storage, such as a computer memory, with a plurality of memory locations and a processor configured to perform the various steps described herein. The computer system may be a special purpose computer system for creating and storing documents for printing, or a general purpose computer system programmed with instructions for carrying out the methods described herein. The computer system may comprise one or more output devices. For example, the computer system may have a first output device in the form of a display screen for viewing the document, and a second output device in the form of a printer or a commercial printing press for printing the document. Thus, the source document may have a first color space corresponding to the display, and the destination document may be color converted for printing on the printing press, in which the color space is defined by the printing inks available on that press, as is well known in the art. More commonly, a PDF may be prepared for one type of output press (e.g. an offset press) that is different than the one actually used for printing (e.g. a digital press). For example, a PDF may be prepared for a CMYK device, when the actual press used may use redundant colors or spot colors or may otherwise have an expanded gamut available, thus requiring color space conversion before printing. The computer system may further comprise a raster image processor (RIP) for preparing the destination document for output on the output device. It should be understood that the display for which the source document is configured, however, may not be a part of the computer system for creating the destination document, outputting the document on the output device, or RIPping the document prior to output. For example, the source document may be formatted for a color space corresponding to the creator of the document, such as a graphics design agency, and the destination document may need to be formatted for display and printing associated with a commercial printing facility.

It should also be understood that the instructions for programming a general purpose computer system to carry out the method steps, may comprise a computer program product embodied on any type of non-transitory computer-readable medium known in the art, such as but not limited to flash drives, hard drives, optical disks such as DVDs, and the like. Computer memory embodying such instructions may be accessible over a computer network for enabling copies of the computer program product to be downloaded from a first memory residing in one location to a second memory residing in a second location. The computer system may include one or more elements connected over a global computer network, such as the Internet, in which one or more memories or processors described herein are centralized and accessible remotely, or in which the instructions are downloaded only temporarily on a local computer system for carrying out the claimed methods. The invention is not limited to any type of computer, computer system, computer memory, or computer-readable medium. It should be further understood that the term computer may refer to multiple computers linked together, just as "computer system" may refer to a single computer having all of the claimed components or functions. Where multiple computer memory locations are referenced, it should be understood that such memory locations may comprise discrete portions of a single memory device, or may comprise separate memory devices, and that such memory locations may be adjacent to one another in a single geographic location, or distributed over locations that are separated from one another in distances measurable in microns or miles. Similarly, the term "processor" should be understood to refer to a single or multiple processors configured to carry out the method steps. Finally, although referred in connection with certain document file types (PDF and PDF/VT) and a specific manner of storing recurring content (XObject), it should be understood that the invention is not limited to any particular file type or storage algorithm, although it is ideal for use in connection with consolidated documents or page definition language (PDL) documents.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for storing a destination variable document corresponding to a source variable document, the source variable document and destination variable document each comprising one or more variable document instances, each variable document instance comprising one or more pages with recurring content and variable content and comprising a plurality of objects arranged in a z-order stack, the method comprising:
   (a) for each page common to the one or more variable document instances, flattening recurring content of the source variable document page and storing the flattened recurring content in a first memory location;
   (b) for each page in the source variable document:
      (i) flattening the page using the variable content of that page and the stored flattened recurring content of step (a);
      (ii) extracting from the resulting data compiled in step (b)(i) any portions of the flattened page in which the variable content contributes to the resulting data, and storing said extracted portions in a second memory location;
      (iii) creating a page in the destination document comprising the stored flattened recurring content of step (a) and the stored extracted portions of step (b)(ii).

2. The method of claim 1, wherein the destination document is configured for output on an output device.

3. The method of claim 2, wherein the output device comprises a device color space that is different than a color space of the source variable document, the method further comprising performing a color conversion from the source variable document color space to the output device color space when storing the destination variable document.

4. The method of claim 3, further comprising:
   color converting the recurring content generated in step (a) from the source variable document color space to the device color space and storing the color-converted, flattened information in a third memory location; and color converting the extracted portions generated in step (b)(ii) from the source variable document color space to the device color space and storing the color converted information in a fourth memory location;

wherein the new page added to the destination variable document in step (b)(iii) comprises the stored, flattened, color-converted, recurring content from the third memory location and the stored, flattened, color-converted, variable content from the fourth memory location.

5. The method of claim 1 further comprising, prior to step (a), identifying recurring content in the source document.

6. The method of claim 1, wherein the source document and the destination document each comprise a portable document format (PDF) file.

7. The method of claim 6, comprising storing each instance of recurring content in the destination document as a form XObject.

8. The method of claim 7, further comprising storing the recurring content form XObject at a bottom of the z-order stack with variable content on top of the form XObject.

9. The method of claim 1, further comprising processing the destination variable document with a raster image processor (RIP) for output on the output device.

10. The method of claim 9, wherein the source variable document and the destination variable document comprise a portable document format (PDF) file and each instance of recurring content is stored in the destination variable document as a form XObject at a bottom of a z-order stack with the variable content on top of the form XObject, the method further comprising raster caching the recurring content with the RIP.

11. A computer system for storing a destination variable document corresponding to a source variable document, the source variable document and destination variable document each comprising one or more variable document instances comprising one or more pages comprising recurring content and variable content and comprising a plurality of objects arranged in a z-order stack, the system comprising:
  means for storing data, having a plurality of memory locations;
  means for flattening content of the source variable document and for storing the flattened content in one of the memory locations;
  instructions stored on the computer system for carrying out the following
  method steps:
    (a) for each page common to the one or more variable document instances, flattening recurring content of the source variable document and storing the flattened recurring content in a first memory location;
    (b) for each page in the source variable document:
      (i) flattening the page using the variable content of that page and the stored flattened recurring content of step (a);
      (ii) extracting from the resulting data compiled in step (b)(i) any portions of the flattened page in which the variable content contributes to the resulting data, and storing said extracted portions in a second memory location;
      (iii) adding a new page to the destination document comprising the stored flattened recurring content of step (a) and the stored extracted portions of step (b)(ii).

12. The computer system of claim 11 further comprising an output device.

13. The computer system of claim 12, wherein the output device comprises a device color space that is different than a color space of the source variable document, and the instructions stored on the computer system further comprise instructions for the steps of:
  color converting the recurring content generated in step (a) from the source variable document color space to the device color space and storing the color-converted, flattened information in a third memory location; and
  color converting the extracted portions generated in step (b)(ii) from the source document color space to the device color space and storing the color converted information in a fourth memory location;
  wherein the new page added to the destination variable document in step (b)(iii) comprises the stored, flattened, color-converted, recurring content from the third memory location and the stored, flattened, color-converted, variable content from the fourth memory location.

14. The computer system of claim 11 further comprising a raster image processor (RIP) for preparing the destination variable document for output on the output device.

15. A non-transitory computer-readable medium that stores a computer program product for storing a destination variable document corresponding to a source variable document, the source variable document and destination variable document each comprising one or more variable document instances comprising one or more pages of recurring content and variable content and comprising a plurality of objects arranged in a z-order, the computer program product comprising instructions for execution by a processor for prompting the processor to perform the following steps:
  (a) for each page common to the one or more variable document instances, flattening recurring content of the source variable document and storing the flattened recurring content in a first memory location;
  (b) for each page in the source variable document:
    (i) flattening the page using the variable content of that page and the stored flattened recurring content of step (a);
    (ii) extracting from the resulting data compiled in step (b)(i) any portions of the flattened page in which the variable content contributes to the resulting data, and storing said extracted portions in a second memory location;
    (iii) adding a new page to the destination variable document comprising the stored flattened recurring content of step (a) and the stored extracted portions of step (b)(ii).

16. The non-transitory computer-readable medium of claim 15, wherein the computer program product further comprises instructions prompting the processor to identify recurring content in the source variable document prior to step (a).

17. The non-transitory computer-readable medium of claim 15, wherein the destination variable document is configured for output on an output device having a device color space that is different than a color space of the source variable document, in which the computer program product further comprises instructions prompting the processor to:
  color convert the recurring content generated in step (a) from the source variable document color space to the device color space and storing the color-converted, flattened information in a third memory location; and
  color convert the extracted portions generated in step (b)(ii) from the source variable document color space to the device color space and storing the color converted information in a fourth memory location;

wherein the new page added to the destination document in step (b)(iii) comprises the stored, flattened, color-converted, recurring content from the third memory location and the stored, flattened, color-converted, variable content from the fourth memory location.

18. The non-transitory computer-readable medium of claim 15, wherein the source document and the destination document comprise a portable document format (PDF) file.

19. The non-transitory computer-readable medium of claim 18, wherein each instance of recurring content is stored in the destination document as a form XObject.

\* \* \* \* \*